(12) United States Patent
Chan et al.

(10) Patent No.: US 11,514,490 B2
(45) Date of Patent: Nov. 29, 2022

(54) SYSTEM AND PROCESS FOR ELECTRONIC CALENDAR PAYMENTS

(71) Applicant: BANK OF MONTREAL, Toronto (CA)

(72) Inventors: Brian Chan, Toronto (CA); Kashif Arshad, Toronto (CA); Peter Hing-Cheong Poon, Toronto (CA)

(73) Assignee: BANK OF MONTREAL, Toronto (CA)

( * ) Notice: Subject to any disclaimer, the term of this patent is extended or adjusted under 35 U.S.C. 154(b) by 0 days.

(21) Appl. No.: 17/263,107

(22) PCT Filed: Jul. 31, 2019

(86) PCT No.: PCT/CA2019/051047
§ 371 (c)(1),
(2) Date: Jan. 25, 2021

(87) PCT Pub. No.: WO2020/024052
PCT Pub. Date: Feb. 6, 2020

(65) Prior Publication Data
US 2021/0295403 A1    Sep. 23, 2021

Related U.S. Application Data

(60) Provisional application No. 62/712,475, filed on Jul. 31, 2018.

(51) Int. Cl.
*G06Q 30/04* (2012.01)
*G06Q 20/32* (2012.01)
*G06Q 20/38* (2012.01)

(52) U.S. Cl.
CPC .......... *G06Q 30/04* (2013.01); *G06Q 20/326* (2020.05); *G06Q 20/38* (2013.01)

(58) Field of Classification Search
None
See application file for complete search history.

(56) References Cited

U.S. PATENT DOCUMENTS

| 8,630,949 B2 | 1/2014 | McLaughlin et al. |
| 2005/0137910 A1 | 6/2005 | Rao et al. |
| 2009/0271303 A1 | 10/2009 | Weng et al. |

(Continued)

FOREIGN PATENT DOCUMENTS

EP    1 291 794 A1 *  3/2003  ............. G06F 17/60

OTHER PUBLICATIONS

WIPO, International Search Report and Written Opinion of International Application No. PCT/CA2019/050845, dated Sep. 5, 2019.

(Continued)

*Primary Examiner* — Joseph W. King
(74) *Attorney, Agent, or Firm* — Foley & Lardner LLP

(57) ABSTRACT

A platform and process for electronic payment processing using electronic calendars and communications from a set of connected servers with logic code to automate machine operations relating to electronic payments. The system and process can generate alerts using fraud detection and verify payment requests using historical data and pattern recognition. The electronic calendar can be integrated into an electronic wallet application.

13 Claims, 7 Drawing Sheets

(56) References Cited

U.S. PATENT DOCUMENTS

| 2013/0198080 A1 | 8/2013 | Anderson et al. |
| 2015/0088709 A1 | 3/2015 | Mekala et al. |
| 2016/0117670 A1 | 4/2016 | Davis |
| 2020/0026710 A1 | 1/2020 | Przada et al. |

OTHER PUBLICATIONS

International Preliminary Report on Patentability, Ch. I, for PCT/CA2019/051047 dated Feb. 11, 2021 (7 pages).

\* cited by examiner

SYSTEM AND PROCESS FOR ELECTRONIC CALENDAR PAYMENTS

CROSS-REFERENCE TO RELATED PATENT APPLICATIONS

This application claims priority to U.S. Provisional Application No. 62/712,475 entitled SYSTEM AND PROCESS FOR ELECTRONIC CALENDAR PAYMENTS filed Jul. 31, 2018, the entire contents of which is hereby incorporated by reference.

FIELD

The present disclosure generally relates to the field of electronic payment processing.

INTRODUCTION

Embodiments described herein relate to payment processing using electronic calendars and messages. For example, customers receive bill or invoice statements from different vendors for payment. The bill or invoice statements can indicate a customer or vendor account, a total payment amount, payment due date, and other data.

SUMMARY

Embodiments described herein relate to payment processing using tokenized calendar reminder/payment links to securely trigger a financial transaction for the customer. An example financial transaction is a bill payment. Example applications can relate to different financial transactions such as: bill payments, retirement savings contributions, tax free savings account contributions, mortgage pre-payments, and so on.

In accordance with an aspect of embodiments described herein, there is provided a system for payment having a set of connected servers configured to: generate an enhanced bill statement file from an electronic bill statement file; extract and store payment data from the enhanced bill statement file, the payment data comprising a customer identifier, a payment amount, and a payment due date; generate a token using the payment data; store the token in association with the customer identifier, the customer identifier linked to the customer record; generate a statement notification having the token and a button to add the electronic calendar entry for the bill statement, the button having logic code to automatically add the electronic calendar entry to an electronic calendar; upon detecting activation of the button, add the electronic calendar entry for the bill statement to electronic calendar using the logic code; receive a payment request from the electronic calendar entry, the payment request including the token linked to a bill statement using the customer identifier; verify the token; retrieve payment data using the token; transmit a payment confirmation request to an electronic address stored in the customer record linked to the payment data, the payment confirmation request populated with the payment data; receive an approval notification in response to the payment confirmation request; generate a vendor payment request using the payment data; transmit the vendor payment request; receive a payment confirmation indicating successful processing of the vendor payment request; and update a payment record with the payment confirmation and the payment data.

In accordance with an aspect of embodiments described herein, there is provided a system for payment having a set of connected servers configured to: generate an enhanced bill statement file from an electronic bill statement file; extract and store payment data from the enhanced bill statement file, the payment data comprising a customer identifier, a payment amount, and a payment due date; generate a token using the payment data; store the token in association with the customer identifier, the customer identifier linked to the customer record; generate a statement notification having the token and a button to add the electronic calendar entry for the bill statement, the button having logic code to automatically add the electronic calendar entry to an electronic calendar; upon detecting activation of the button, add the electronic calendar entry for the bill statement to electronic calendar using the logic code; receive a payment request from the electronic calendar entry, the payment request including the token linked to a bill statement using the customer identifier; verify the token; retrieve payment data using the token; transmit a payment confirmation request to an electronic address stored in the customer record linked to the payment data, the payment confirmation request populated with the payment data; receive an approval notification in response to the payment confirmation request, the approval notification approving a payment transaction; receive a payment confirmation indicating successful processing of the approved payment transaction; and update a payment record with the payment confirmation and the payment data.

In accordance with an aspect of embodiments described herein, there is provided a system for payment having a set of connected servers configured to: generate an payment transaction file; extract and store payment data from the enhanced file, the payment data comprising a customer identifier, a payment amount, and a payment date; generate a token using the payment data; store the token in association with the customer identifier, the customer identifier linked to the customer record; generate a statement notification having the token and a button to add the electronic calendar entry for the transaction, the button having logic code to automatically add the electronic calendar entry to an electronic calendar; upon detecting activation of the button, add the electronic calendar entry with the token to electronic calendar using the logic code; receive a payment request from the electronic calendar entry, the payment request including the token using the customer identifier; verify the token; retrieve payment data using the token; transmit a payment confirmation request to an electronic address stored in the customer record linked to the payment data, the payment confirmation request populated with the payment data; receive an approval notification in response to the payment confirmation request, the approval notification approving a payment transaction; receive a payment confirmation indicating successful processing of the approved payment transaction; and update a payment record with the payment confirmation and the payment data.

In accordance with an aspect, there is provided a system for payment processing that involves a payment server having a non-transitory computer-readable storage medium with computer-executable instructions for causing a processor of the payment server to: receive a payment request from a button at an electronic calendar entry, the payment request including a token linked to a bill statement; verify the token; retrieve payment data using the token; transmit a payment confirmation request to an electronic address stored in a customer record linked to the payment data, the payment confirmation request populated with the payment data;

receive an approval notification in response to the payment confirmation request; generate a vendor payment request using the payment data based on a vendor format, the payment data indicating a vendor identifier linked to the vendor format; transmit the vendor payment request; receive a payment confirmation indicating successful processing of the vendor payment request; and update a payment record with the payment confirmation and the payment data.

In some embodiments, the system has an electronic wallet application having a non-transitory computer-readable storage medium with computer-executable instructions for causing a processor of a mobile device to: provide an electronic calendar storing the electronic calendar entry; trigger the display of the payment confirmation request on a display device; receive the approval notification in response to the display of the payment confirmation request at the mobile device; transmit the approval notification to the payment server.

In some embodiments, the electronic wallet application is further configured to authorize a customer account prior to receiving the approval notification.

In some embodiments, the payment server is configured to process a registration request to store the electronic address in the customer record to permit processing of the payment request.

In some embodiments, the payment server is configured to determine that a previous bill payment corresponding to the bill statement has already been made and generate a notification indicating that the previous bill payment corresponding to the bill statement has already been made.

In some embodiments, the payment server is configured to determine that a future dated payment request corresponding to the bill statement is already configured and generate a notification indicating the future dated payment request.

In some embodiments, the token is encrypted, the payment server being configured to decrypt the token.

In some embodiments, the payment data indicates a payment account, wherein the vendor payment request indicates the payment account.

In some embodiments, the approval notification indicates a payment account identifier linked to the payment account.

In some embodiments, the payment request indicates a payment amount, a payment due date, vendor identifier, and vendor account identifier.

In some embodiments, the vendor payment request indicates a payment amount, a payment due date, vendor identifier, a vendor account identifier, and a payment account.

In some embodiments, the payment server determines if the payment request is a duplicate request using historical payment records and upon determining that the initial payment request is a duplicate indicating the detected duplicate in the payment confirmation request.

In accordance with an aspect, there is provided a non-transitory computer-readable storage medium with computer-executable instructions for causing a processor to: receive a payment request from a button at an electronic calendar entry, the payment request including a token linked to a bill statement; verify the token; retrieve payment data using the token; transmit a payment confirmation request to an electronic address stored in a customer record linked to the payment data, the payment confirmation request populated with the payment data; receive an approval notification in response to the payment confirmation request; generate a vendor payment request using the payment data based on a vendor format, the payment data indicating a vendor identifier linked to the vendor format; transmit the vendor payment request; receive a payment confirmation indicating successful processing of the vendor payment request; and update a payment record with the payment confirmation and the payment data.

In accordance with an aspect, there is provided a system for payment processing that involves a payment server having a non-transitory computer-readable storage medium with computer-executable instructions for causing a processor of the payment server to: receive an electronic bill statement file; generate an enhanced bill statement file; retrieve payment data from the enhanced bill statement file, the payment data comprising a customer identifier, a payment amount, and a payment due date; generate a token using the payment data; store the token in association with the customer identifier; generate a payment confirmation request having the token and a button to add an electronic calendar entry for the bill statement, the button having logic code to automatically add the electronic calendar entry to an electronic calendar; transmit the payment confirmation request to an electronic address stored linked to the customer identifier.

In some embodiments, the system has an electronic wallet application having a non-transitory computer-readable storage medium with computer-executable instructions for causing a processor of a mobile device to: provide the electronic calendar storing the electronic calendar entry; and trigger the display of the payment confirmation request on a display device.

DETAILED DESCRIPTION

Embodiments of methods, systems, and apparatus are described through reference to the drawings.

Figure 1:
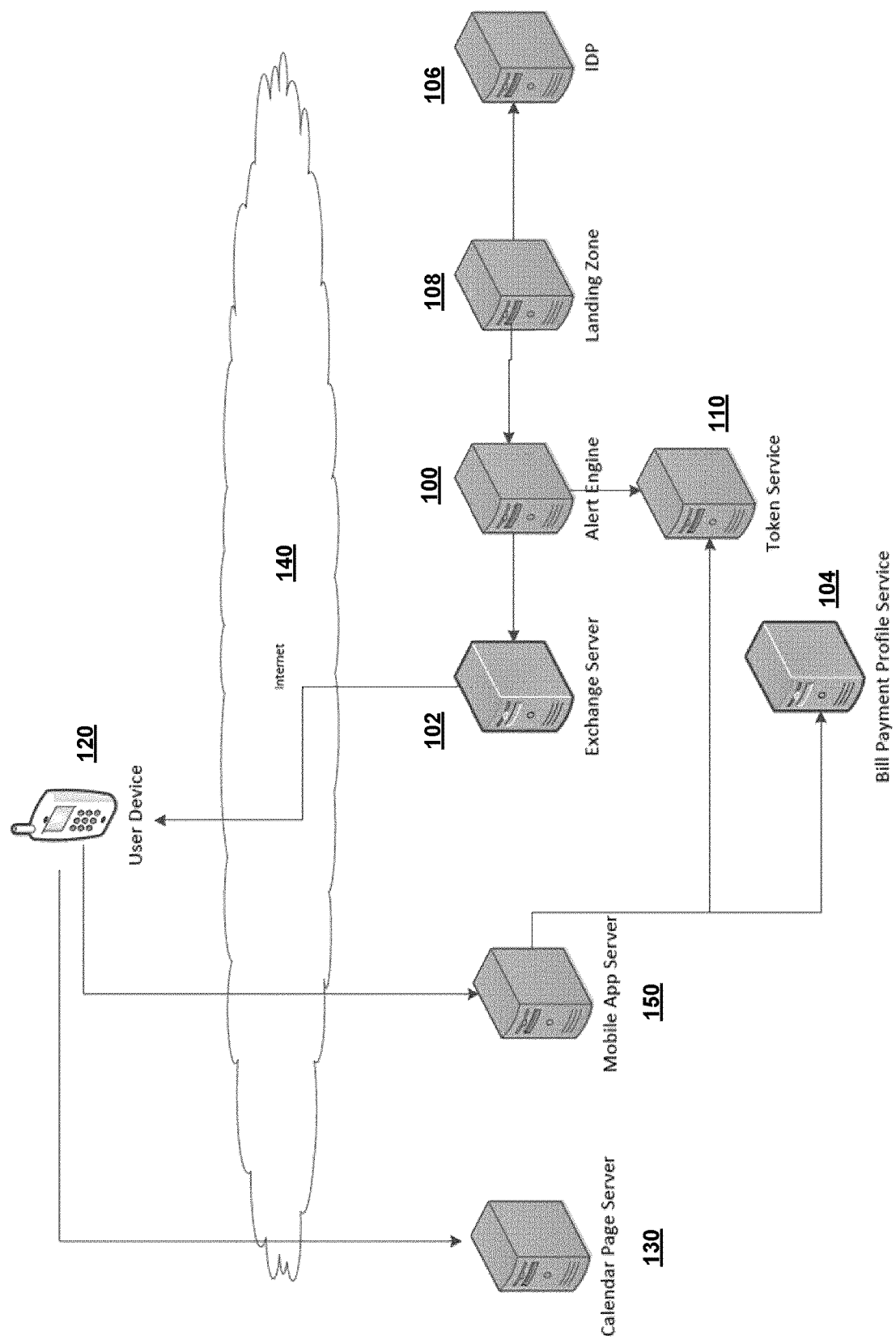
FIG. 1 is a schematic diagram of a platform for electronic calendar payments according to some embodiments.

FIG. 1 shows a platform for electronic calendar payments that uses tokenized calendar reminder/payment links to securely trigger a financial transaction for the customer. The payments can be for different types of financial transactions. Examples include bill payments, retirement savings contributions, mortgage payments, and so on. In some embodiments, the platform is configured to automatically process bill or invoice statements for customers using electronic calendar entries according to some embodiments. The electronic calendar entries may be part of an electronic calendar. The electronic calendar may be part of a mobile application or may be a hosted by a network server. The electronic calendar may also be integrated into an electronic banking application or wallet application, for example. The platform provides a mechanism for customers to automatically add electronic calendar entries as an alert or a reminder to pay for bills (with a link to payment logic), automatically add reminders or alerts to their electronic calendars for payment of bills (with a link to payment logic code), and pay for bills using the electronic calendar entries. The platform automatically updates an electronic calendar with calendar entries for automatic payments.

The platform for electronic calendar payments can include a calendar page server 130, mobile application server 150, bill payment profile service 104, exchange server 102, alert engine 100, landing zone 108, Information Delivery Platform (IDP) 106, token service 110, and so on. Further details of IDP are provided in U.S. patent application Ser. No. 16/517,253 entitled SYSTEMS AND METHODS FOR DATA STORAGE AND PROCESSING, the entire contents of which is hereby incorporated by reference. IDP can provide customer data from a variety of different data sources. A mobile device 120 can connect to components of the platform via Internet or other network 140. The mobile device 120 can have an electronic wallet application to connect to components of platform. The mobile device 120 can also have an electronic calendar application and/or connect to a hosted electronic calendar. For example, the hosted electronic calendar can be host by calendar page server 130, for example.

Figure 7:
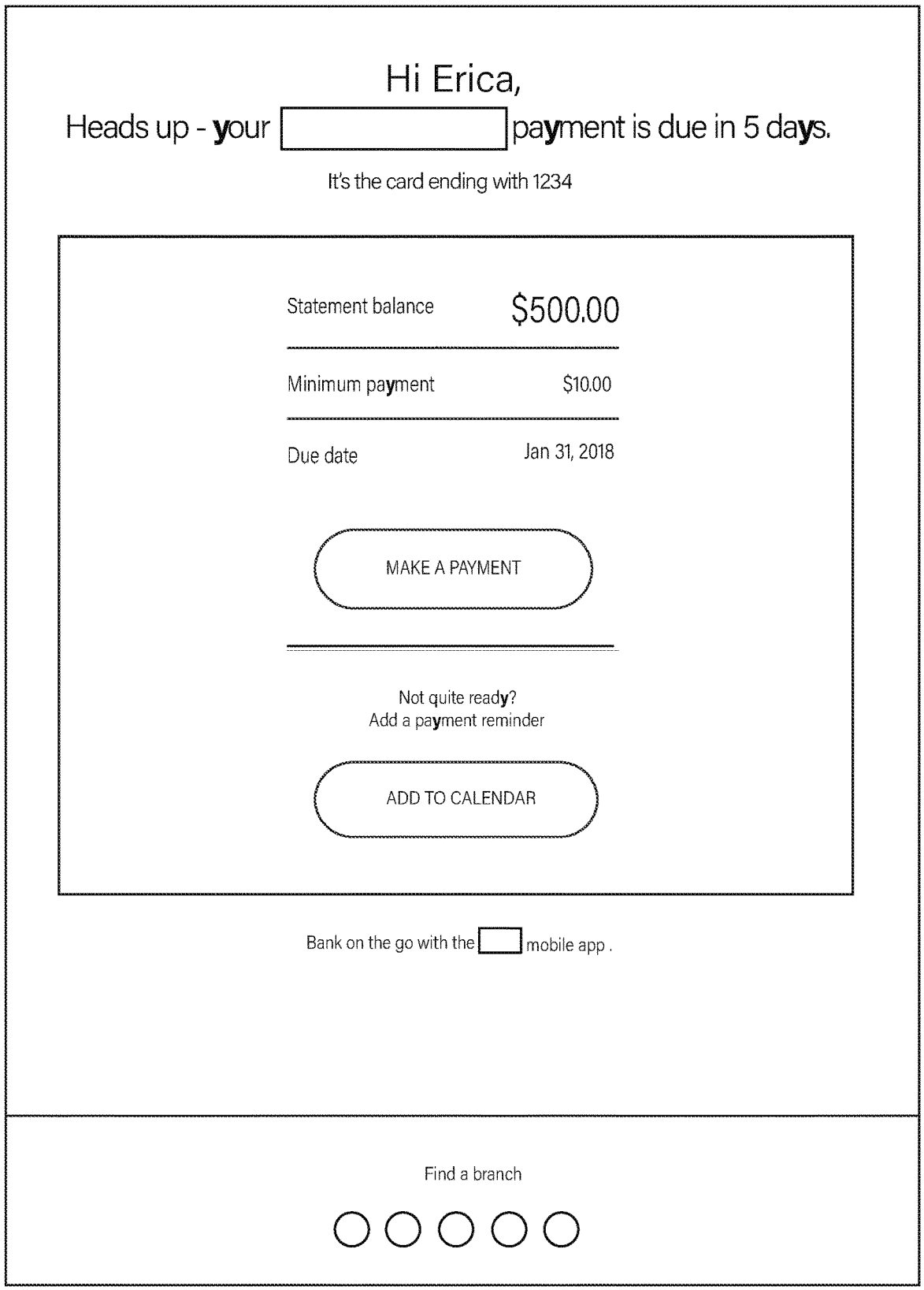
FIG. 7 shows a screenshot of an example interface that includes buttons to trigger payment actions according to some embodiments.

The landing zone 108 receives an electronic bill statement and interacts with IDP 106 to generate an enhanced statement file. FIG. 7 shows a screenshot of an example interface of an enhanced statement file that includes buttons to trigger payment actions according to some embodiments.

The enhanced statement file can be used to generate an electronic message for a bill payment that can include an electronic button "add to calendar" to trigger workflow by platform to automatically create a calendar entry and alert for the bill payment with data extracted from the electronic message, and to add the calendar entry to the electronic calendar. The enhanced statement file can be used to generate an electronic message for a bill payment that can include an electronic button "pay bill" to trigger workflow by platform to automatically make the bill payment with data extracted from the electronic message.

The alert engine 100 can interact with token service 110 to embed a token for the bill payment within the enhanced statement file. The alert engine 100 can generate and transmit an electronic message for a bill payment that can include the token along with data from the enhanced statement file. The message can include a deep link. The deep link includes the token with payment data with machine instructions for automatically making the bill payment. The deep link can include or link to bill payment attributes such as the customer identifier, vendor identifier, payment amount, customer account, and so on. The contents of the token can include: Time to live; One time use status to notify the customer payment has been made; Analytics tracking; Payment details including company name, account #, amount, payment date, method of payment such Bill payment, internal funds transfer, SWIFT, ACH, EFT, etc.

The calendar entry or alert includes the deep link for selection to automate the bill payment. The alert engine 100 can generate and transmit an electronic message for a bill payment that can include an electronic button "add to calendar" to trigger automatically adding an alert or calendar entry for the bill payment with data extracted from the enhanced statement file. Example data that can be extracted from the statement file and added to the calendar entry includes: Company name, Special notes/message, Account number, Amount due, Minimum payment due, Method of payment such as Bill payment, internal funds transfer, SWIFT, ACH, EFT, etc.

The mobile application server 150 manages a mobile banking application or electronic wallet application. The calendar page server 130 manages an electronic calendar that can include calendar entries for the bill payment. The electronic calendar can be an application or can be integrated with an electronic wallet application. In some embodiments, the user device 120 has an electronic wallet application and/or calendar application having a non-transitory computer-readable storage medium with computer-executable instructions for causing a processor of the user device 120 to trigger the display of the electronic message with the bill payment data and the button to add the bill payment to the electronic calendar on a display of the user device 120. As noted, the wallet application can include an electronic calendar or can integrate with a separate electronic calendar application, for example. The electronic wallet application can receive the approval notification in response to the display of the bill payment data at the user device 130. The approval can indicate instructions to add the calendar entry for the bill. The electronic wallet application can transmit an alert notification to the bill payment profile service 104 as part of the payment history record, for example. In some embodiments, the electronic wallet application is further configured to authorize a customer account prior to receiving the approval notification for adding the calendar entry with the alert for payment of the bill.

The calendar page server 130 gets all the information it needs to create the calendar entry. Once the customer clicks on the deep link in the calendar entry then the mobile application on user device 120 is launched and customer can sign in to the mobile application. Example information used to create the calendar entry: Vendor name; Payment due date; Payment amount; Customer/account identifier; If credit card: Minimum payment.

The exchange server 102 can interact with the user device 120 to transmit an electronic message with the bill statement data. The bill payment profile service 104 can manage a customer profile with customer data, payment approvals, payment history, and so on.

The platform components have a non-transitory computer-readable storage medium with computer-executable instructions for causing one or more processors to transmit a bill payment or statement notification as an electronic message. The bill payment statement indicates a payment due date indicating a future date the bill payment is due. The platform can extract that the payment due date (and other payment data) to generate an alert or entry for the electronic calendar. The statement can include an electronic button to automatically add a calendar entry for the bill and the date of the calendar entry is based on the payment due date. It may be before the payment due date based on a defined range or interval, for example.

The statement notification can be sent from exchange server 102, for example. The bill payment profile service 104 manages customer data including an electronic address for the transmission of the statement notification. The platform can generate the statement notification using landing zone 108, alert engine 100, IDP 106, and token service 110. The statement notification generation can involve a data extraction process to generate extracted payment data along with enhancement of the payment data and token generation. Extracted payment data includes, for example, payment amount, payment due date, vendor name, customer or account identifier, and so on. The platform can receive a payment confirmation indicating a request to add an alert or calendar entry to an electronic calendar managed by mobile app server 150 and/or calendar page server 130. The platform can update a payment record with the payment confirmation and the extracted payment data. The bill payment profile service 104 can update a customer record and/or payment record to indicate a customer identifier linked to the customer account and the alert. The bill payment profile service 104 can manage customer profiles or records.

In some embodiments, the platform can process a registration request to store a customer bill payment profile as part of a customer record (e.g. at bill payment profile service 104) to permit processing of the initial payment request for addition to the electronic calendar. In some embodiments, upon receiving a request to add a bill payment to an electronic calendar, the platform can determine that the customer record does not indicate bill payment registration and transmit a registration request to the user device 120, for example. The registration request can indicate that the initial payment request was received to provide an indication to the customer for confirmation.

In some embodiments, the platform determines if the request to add the bill payment alert is a duplicate request using historical customer records (stored at IDP 106 for example). Upon determining that the initial request is a duplicate, the platform can indicate the detected duplicate in the payment confirmation request, such as "This is a duplicate request. Do you still want to proceed?". A duplicate request can be detected by remembering if the customer has already activated the 'add to calendar' functionality. This can be started from the electronic statement, or within a banking application.

Accordingly, the platform can provide a system for payment processing that involves different servers having a non-transitory computer-readable storage medium with computer-executable instructions for their configuration. The mobile application server 150, for example, can receive a payment request from a button at an electronic calendar entry managed by the calendar page server 130. The payment request can include a token linked to a bill statement. In some embodiments, the payment request indicates a payment amount, a payment due date, vendor identifier, and vendor account identifier. The button can trigger the sign-in process for the application and land on the payment page with all the information pre-populated for customer to proceed with the payment. In some embodiments, the button can trigger the payment directly on the clicking of the link and the customer can receive notification. In some embodiments, the button can trigger a confirmation message for customer to confirm before the payment is made.

The alert engine 100 can verify the token using the token service 110 and the bill payment profile server 104. The alert engine can retrieve payment data using the token and transmit a payment confirmation request to an electronic address stored in a customer record linked to the payment data. The payment confirmation request can be populated with the payment data. The payment confirmation request can be a bill payment page, for example. The alert engine 100 can receive an approval notification in response to the payment confirmation request. In some embodiments, the approval notification indicates a payment account identifier linked to the payment account. The token can be verified against a corresponding token stored in a database when it was initially created. On the click, the token is validated that it was not already consumed or expired before the customer clicks to do the payment.

The alert engine can generate a vendor payment request using the payment data based on a vendor format. In some embodiments, the payment data indicates a payment account, and the vendor payment request indicates the payment account. In some embodiments, the vendor payment request indicates a payment amount, a payment due date, vendor identifier, a vendor account identifier, and a payment account. The payment data can indicate a vendor identifier linked to the vendor format. The platform can transmit the vendor payment request and receive a payment confirmation indicating successful processing of the vendor payment request. The alert engine 100 can update a payment record with the payment confirmation and the payment data. The payments to the vendor can go through a bank system, and can be formatted the same. Different types of bills can have different types of data elements unique for that category. For example, Credit Card bills would have a minimum payment that may not be there on hydro bill. The payments to the vendor will go through the bank system, and therefore be formatted the same.

In some embodiments, the mobile application server 150 provides an electronic wallet application having a non-transitory computer-readable storage medium with computer-executable instructions for causing a processor of a user device 120 to provide an electronic calendar (e.g. hosted by calendar page server 130) storing the electronic calendar entry. The electronic wallet application can trigger the display of the payment confirmation request on a display device of the user device 120. The electronic wallet application can receive the approval notification in response to the display of the payment confirmation request at the user device 120. The electronic wallet application can transmit the approval notification to another server. In some embodiments, the electronic wallet application is further configured to authorize a customer account prior to receiving the approval notification.

In some embodiments, the mobile application server 150 is configured to process a registration request to store the electronic address in the customer record to permit processing of the payment request. For example, the mobile application server 150 can provide an option at an interface to register for the bill payment process.

In some embodiments, the alert engine 100 is configured to determine that a previous bill payment corresponding to the bill statement has already been made and generates a notification indicating that the previous bill payment corresponding to the bill statement has already been made. The alert engine 100 can interact with bill payment profile server 104 to determine whether there is a duplication payment, for example.

In some embodiments, the alert engine 100 is configured to determine that a future dated payment request corresponding to the bill statement is already configured and generate a notification indicating the future dated payment request. The alert engine 100 can interact with bill payment profile server 104 or token service 110 to determine that there is already a calendar entry for the bill statement, for example. The alert engine 100 can record the entry data store when customer gets the Calendar entry added to the calendar and the alert engine 100 can look up the data store to see if the customer had already created calendar entry for this specific bill.

In some embodiments, the token service 110 generates an encrypted token and is configured to decrypt the token (or is involved in the decryption process) in response to receiving the token as part of a payment request.

In some embodiments, the alert engine 100 determines if the payment request is a duplicate request using historical payment records. Upon determining that the initial payment request is a duplicate, the alert engine 100 can indicate the detected duplicate in the payment confirmation request.

The landing zone 108 can receive an electronic bill statement file and interact with the IDP 106 to generate an enhanced bill statement file. The alert engine 100 can retrieve payment data from the enhanced bill statement file. The payment data can include a customer identifier, a payment amount, and a payment due date. The alert engine 100 interacts with the token service 110 to generate a token using the payment data. The token service 110 stores the token in association with the customer identifier. The token can have an unique identifier and the token can have all the data elements needed to do the Bill Payment and stop duplicate payments. The alert engine 100 generates a payment confirmation request (e.g. as part of an email 202) having the token and a button to add an electronic calendar entry for the bill statement. The button can have logic code to automatically add the electronic calendar entry to an electronic calendar. The alert engine 100 can transmit the payment confirmation request to an electronic address stored linked to the customer identifier. The alert can be in an email, SMS or Push Notification along with the link/button which calls a URL to generate the calendar entry by passing the token and other data elements. The button can also call a mobile or wallet application to add the calendar entry if the application has calendar permissions or functionality.

In some embodiments, the mobile application server 150 can generate an electronic wallet application for user device 120 having a non-transitory computer-readable storage medium with computer-executable instructions for causing a processor of the user device 120 to provide the electronic calendar storing the electronic calendar entry, and trigger the display of the payment confirmation request on a display device of the user device 120.

Figure 2:
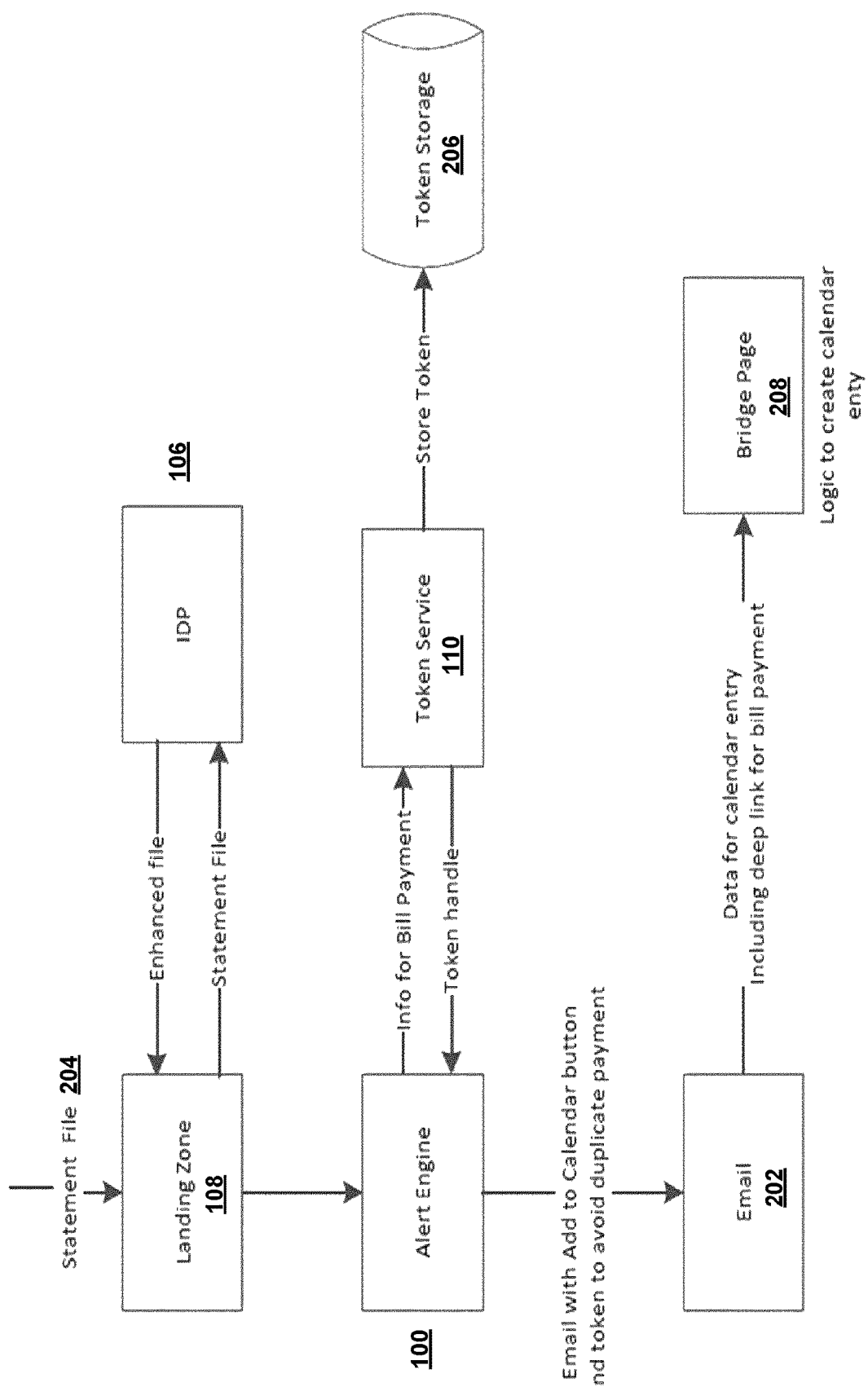
FIG. 2 shows a dataflow diagram for adding electronic calendar payments according to some embodiments.

FIG. 2 shows a dataflow diagram for adding electronic calendar payments according to some embodiments.

The landing zone 108 receives a statement file 204. The landing zone 108 transmits the statement file 204 to the IDP 106 for processing. The landing zone 108 receives an enhanced statement file from the IDP 106. The landing zone 108 can be a server configured for file transfer. In this example, the landing zone 108 receives the statement file and the IDP 106 receives the statement file from the landing zone 108. The IDP 106 enhances the file based on other attributes of the bill that are used as part of the alert e.g. Customer Name, Statement Balance, Minimum Balance, Due date.

The alert engine 100 can generate an electronic notification (e.g. email 202 or SMS, push notification, 3rd party messaging platforms) for the bill payment including data from the enhanced statement file and an "add to calendar" button as part of email template for an alert (calendar entry with a configured reminder or alert notification). The alert engine 100 can generate an electronic notification with a token. The alert engine 100 can transmit data for the bill payment (from the enhanced statement file) to the token service 110. The token service 110 can generate the token. In some embodiments, the token can contain a combination of Payment Due Date, Amount and Last 4 digits of the biller account number. The token service 110 can encrypt the token. The token is embedded in the deep link by alert engine 100. An application (e.g. calendar application or mobile wallet application) can extract and decrypt the token (and access the information embedded therein). The token service 110 can use an encryption service for encryption/decryption and keys are managed by the encryption service. Generated tokens can be kept in a database along with an expiry time. When the customer initiates the payment, the token is validated and data elements for payment are extracted. The token is removed after one-time use.

The enhanced file attributes can be used by alert engine 100 to add the button to the email bill statement. Enhanced attributes can refer to attributes that are not part of original statement file received e.g. previous payment indicator, customer name. There can be a button for "pay now" which embeds a deep link with payment logic for automatic payment of the bill. This button can trigger a login to the application and show the payment page pre-populated for customer to confirm payment or it can trigger an SMS/Push Notification to the customer with the payment information to confirm before the payment is made. The button can also trigger a notification to customer after the payment is done so that customer is aware of any transaction completed.

There is also an "add to calendar" button to trigger the bridge page 208. The bridge page 208 has logic to trigger the addition of the deep link to create the alert or calendar entry. The deep link includes a token with payment data with machine instructions for automatically making the bill payment. The deep link can include or link to bill payment attributes such as the customer identifier, vendor identifier, payment amount, customer account, and so on. The calendar entry or alert includes the deep link for selection to automate the bill payment. The deep link opens up the mobile application and after successful authentication, it can direct the user to Bill Payment page with all the details pre-populated. The customer can review and submit the bill payment at the Bill Payment page, for example. Another attribute can be Duplicate Payment Indicator. The deep link can have the attributes as part of the URL parameters to be passed to the application for processing.

Accordingly, the alert engine 100 can get the Enhanced eStatement file from Landing Zone 108 and process it to send out an electronic notification with alerts including an "Add to Calendar" button. For example, the alert engine 100 can extract the Due Date, Statement Balance and last 4 digits of biller account number from the Enhanced eStatement file for transmission to token service 110 to get the token. The token service 110 generates the token to avoid duplicate payments. Once the token is used for payment, then the token is removed from the database to avoid duplicate payments.

The bridge page 208 can reside on the calendar page server 130. The bridge page 208 can get all the data it needs to create calendar entry from the "Add to Calendar" button in the email.

The User Device 120 transmits an electronic message with a payment request to Exchange Server 150 e.g. using the electronic message 202 or the calendar entry. The electronic message with the payment request can indicate a token (e.g. the token embedded in the calendar entry) linked to data relating to a bill or invoice, such as a customer or account identifier, payment amount, payment date, and so on. The Exchange Server 150 can implement a virus scan on the received electronic message with the payment request.

The alert engine 100 initiates a data extraction process on the enhanced statement file. The alert engine 100 can tokenize the extracted content. The tokenized data (e.g. Bill Payment Attributes) can include customer electronic address, biller account identifier or number, bill payment due date, bill payment amount, and so on.

The alert engine 100 transmits the tokenized data to the token service 110 to generate the token linked to the specific bill statement that can be used to process the payment request for the bill statement. The alert engine 100 retrieves the customer profile from the Customer and Bill Payment Information to identify a customer electronic address. The alert engine 100 checks to see if there are historical records of payments to the biller or issuer, and whether this is a duplicate payment request. In some embodiments, alert engine 100 checks to see if there is at least one payment in the past to the biller or issuer using the biller account number or identifier. IDP has record of past payments and it can correlate the history of payments to see if the bill for this cycle was already paid.

Figure 3:
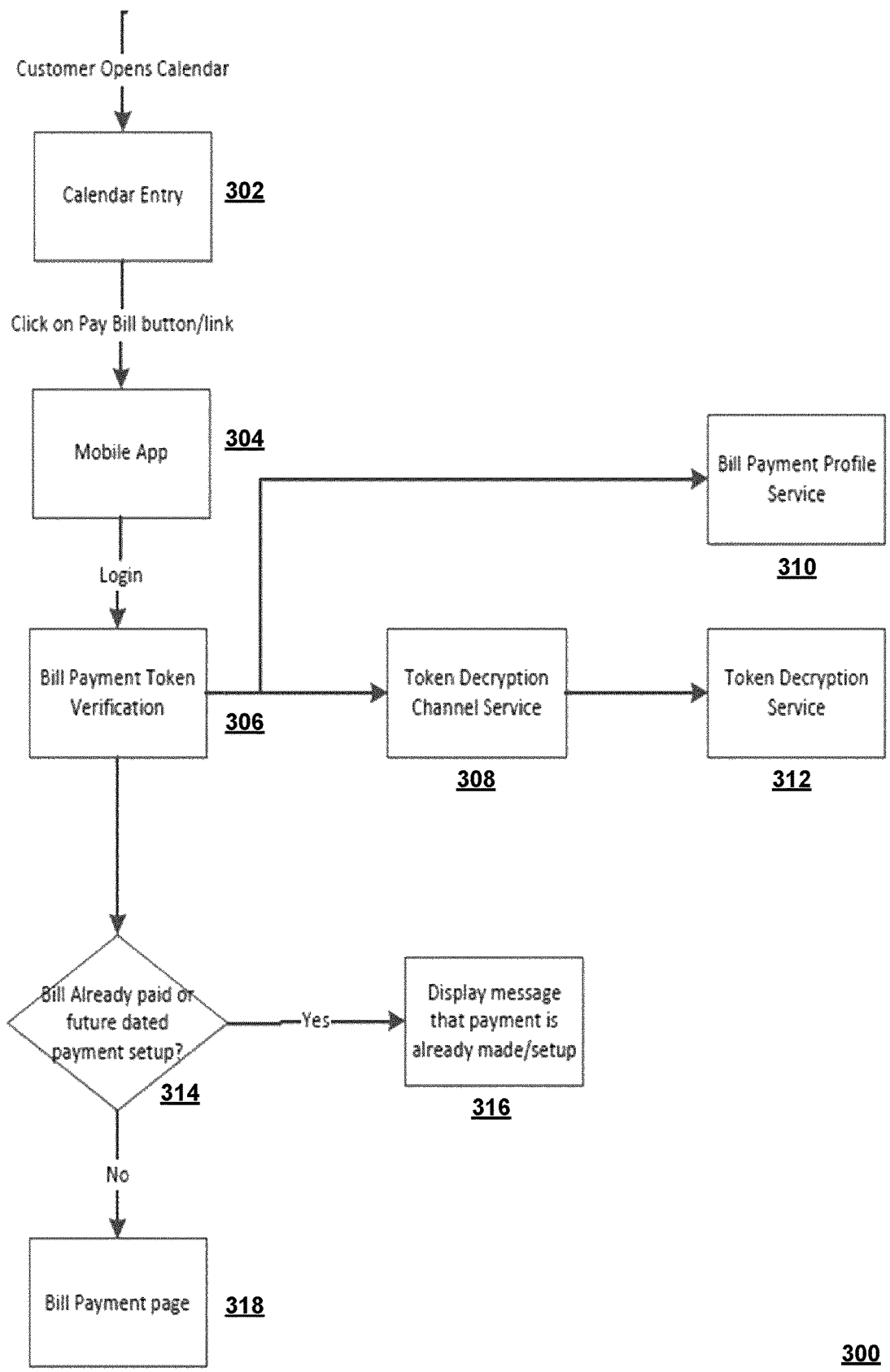
FIG. 3 shows a dataflow diagram for bill payments using electronic calendar payments according to some embodiments.

FIG. 3 shows a dataflow diagram for bill payments using electronic calendar payments according to some embodiments. The user device 120 can activate the calendar entry 302 to trigger the payment process. This can be in response to getting the reminder or alert notification for the bill payment from the electronic calendar or wallet application. The calendar entry 302 can have logic to trigger the alert notification proximate to the payment due date for the bill. The calendar entry 302 can have a "pay bill" button to trigger payment of the bill. The button can be a deep link to mobile application, a command to another application to trigger notification to customer to confirm payment to be done, and so on. The user device 120 can also receive an alert notification or a reminder saying "do you want me to proceed with the bill payment" to automatically trigger the payment. The alert notification or reminder includes the deep link to automate the payment process. The reminder or the calendar entry may be part of the electronic wallet application as a push notification reminder, for example.

Activation of the calendar entry 302 triggers the mobile application 304 (e.g. electronic calendar or wallet application) to implement the payment process. The calendar entry 302 can have a "pay bill" button to trigger the mobile application 304 (e.g. electronic calendar or wallet application) to implement the payment process. The mobile application 304 can prompt for a user login or authentication process. Upon verification, the mobile application 304 can interact with the Bill Payment Token Verification 306 for the payment process. The mobile application 304 can receive data from the deep link in the calendar entry 302. The deep link can include the token, for example. The token includes or links to data relating to the bill payment, including payment amount, vendor, customer identifier, and so on.

The Bill Payment Token Verification 306 verifies the payment. If the token is expired or already consumed, it will notify the customer that the payment has been already done based on the payment history of the biller. The Bill Payment Token Verification 306 retrieves the token from the deep link or receives the token from the mobile application 304. The token can be encrypted. The Bill Payment Token Verification 306 can provide the encrypted token to the token channel decryption service 308 and token decryption service 312 in order to decrypt the token. The Bill Payment Token Verification 306 can provide the token and/or bill payment data (e.g. from the deep link) to the Bill Payment Profile Service 310. The token has associated data stored in the database which is secured. The token is linked to secured data in a data store. When this data is extracted based on the token, it is secure as all this data was not part of the data sent to the customer's device.

At 314, the Bill Payment Token Verification 306 determines if the bill is already paid or if there is a future dated payment already set up. For example, the Bill Payment Token Verification 306 can interact with Bill Payment Profile Service 310 to retrieve the payment history and future dated payments for the vendor identified by the token and see if there was a payment made since the last statement date matching the statement balance (e.g. to identify a potential duplicate or mistake payment) or if there is a future dated payment setup before the due date. At 316, the Bill Payment Token Verification 306 triggers the display of a notification (e.g. at user device 120 or mobile application 304) that payment has already been made or that a future dated payment is already set up.

The Bill Payment Page 318 can indicate the information to pay the bill which can be pre-populated with e.g. the amount, from account (if customer did a payment in the past), biller, date, and so on. The information can be linked to the token or the customer record, for example. The information is stored in the DB when the token is generated along with the token information. The customer can validate the information and press the continue button to complete the payment process.

Figure 4:
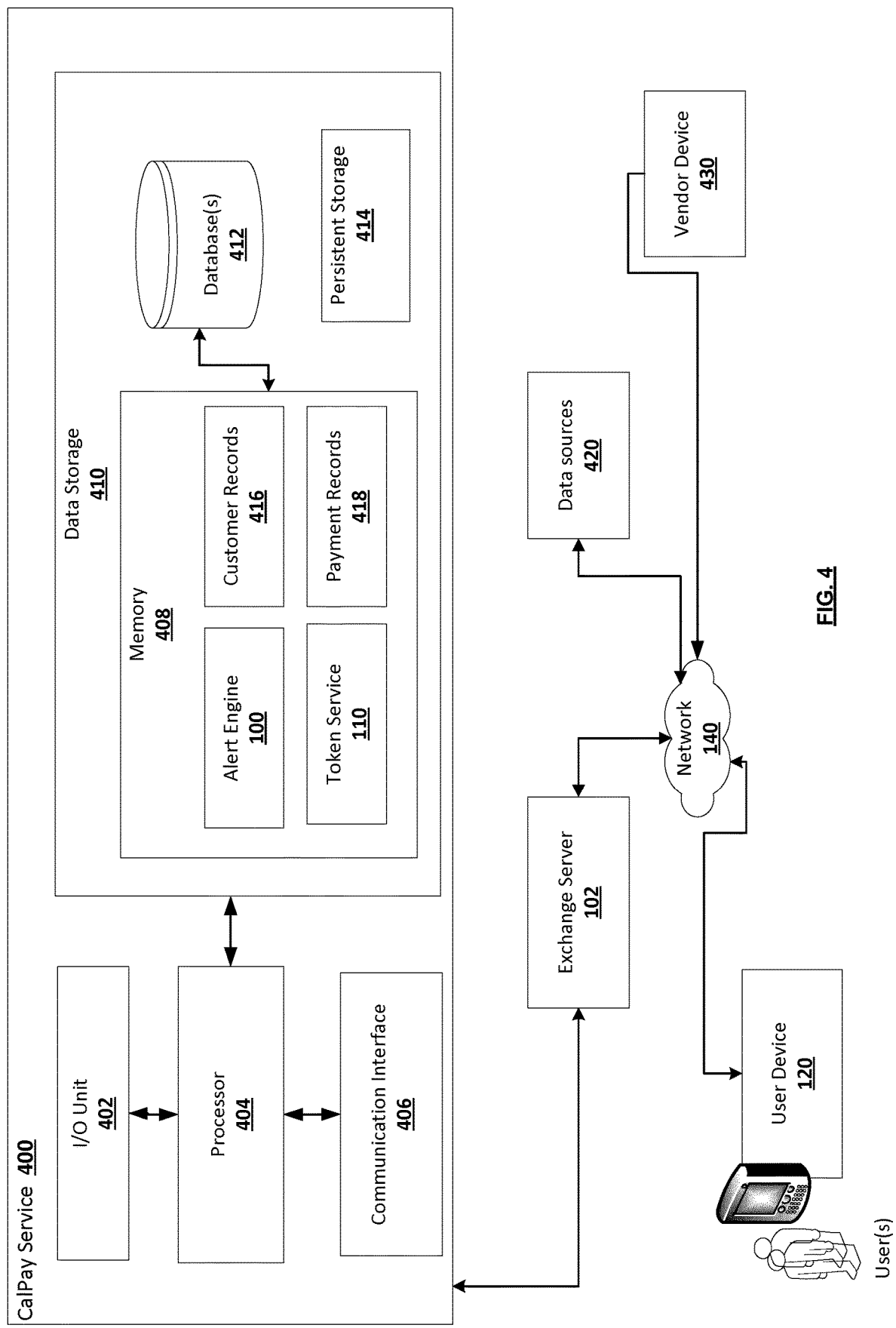
FIG. 4 is a schematic diagram of a platform for electronic calendar payments according to some embodiments.

FIG. 4 shows a physical environment of a CalPay service 400 according to some embodiments. The CalPay service 400 can implement aspects of the processes described herein.

The CalPay service 400 connects to interface application at User Device 120, Exchange Server 102, vendor device 430, and data sources 420 using network 140. Data sources 420 can interact with the CalPay service 400 to provide input data for storage in data storage 410. Network 140 (or multiple networks) is capable of carrying data and can involve wired connections, wireless connections, or a combination thereof. Network 140 may involve different network communication technologies, standards and protocols, for example. The calendar or electronic wallet application can be installed on user device 120 or calendar can be part of a digital wallet application) to display an interface of visual elements that can represent payment alert notifications or confirmations, for example.

The CalPay service 400 can include an I/O Unit 402, a processor 404, communication interface 406, and data storage 410. The processor 404 can execute instructions in memory 408 to implement aspects of processes described herein. The processor 404 can execute instructions in memory 408 to configure alert engine 100, token service 110, fraud detector, customer records 416, payment records 418, and other functions described herein. The CalPay service 400 may be software (e.g. code segments compiled into machine code), hardware, embedded firmware, or a combination of software and hardware, according to various embodiments.

The CalPay service 400 service receives the request to generate the bill payment notification from Exchange Server 150 or other component (e.g. landing zone 108). The request can include bill payment data extracted from the electronic invoice or bill statement, including customer identifier, customer's initial payment request address (e.g. an electronic address linked to the customer that the initial payment request and electronic invoice or bill statement was received from), customer data, vendor data, payment amount, payment due date, and so on. The CalPay service 400 can generate a payment message that can be in a format specific to the vendor device 430 or can be a general format that can be converted to a format specific to the vendor device 430. The CalPay service 400 service can also receive the request to add the payment to calendar, as described herein. The CalPay service 400 uses token service 110 to generate the token and/or deep link for the calendar entry, for example.

The CalPay service 400 can also decrypt a received token using the token service 110 to retrieve data in order to process a payment.

The CalPay service 400 can lookup customer data using customer records 126 upon receiving a request or token to identify an internal customer identifier or account number to associate with the request or token. For example, the request can indicate an identifier associated with a customer and the CalPay service 400 can retrieve a customer record 126 using the identifier. Other customer lookup data can be used, such as a customer name, address, vendor or bill account number, and so on.

The customer record 126 can indicate contact data for the customer, including contact data for channels of communication linked to the user device 120 or mobile application 304, for example. The CalPay service 400 can verify the contact address using at least a part of a customer record prior to processing the request. The electronic contact addresses can be collected and saved to customer record 416 as part of a registration process, for example. The alert engine 100 can transmit notifications to the user device 120 using the contact data, for example. The CalPay service 400 can receive a confirmation response to the payment verification request approving or denying a payment request. In some embodiments, the confirmation response can indicate a payment account that the CalPay service 400 can cross-reference to the customer account 126. For example, the payment account may indicate "pay with credit card" or "pay with chq account" and the customer record 416 can include account identifiers for the payment accounts. The CalPay service 400 can update the payment request based on the payment account data.

The CalPay service 400 can receive a payment confirmation from the Exchange Server 150 and/or other component. The CalPay service 400 updates the payment record 418 with the payment details as part of a payment history.

The customer record 126 can indicate whether a specific customer is registered for bill payment by CalPay service 400. If the customer record 126 is associated with a customer identifier or other customer lookup data and the customer record 126 indicates that the customer is not registered for bill payment by CalPay service 400 then the alert engine 100 can transmit a registration request to the customer using contact data stored in the customer record 126. This can be contact data for a different channel of communication than the initial request contact address to add a security measure.

The CalPay service 400 can check payment records 418 to see if there is a least one past payment from the customer to the issuer of the bill statement or the vendor associated with the bill statement. A payment record 418 can indicate a payment date, payment amount, invoice identifier, customer identifier, vendor identifier, and so on. Each payment record 418 may include a payment receipt identifier that may be stored as part of a customer record 416, for example, to provide a listing or collection of payment records 418 associated with a given customer. As another example, each payment record 418 can indicate a customer identifier that can be indexed to a customer identifier of a customer record 416. The CalPay service 400 can use the customer identifier to generate a dynamic list of all payment records 418 corresponding to a given customer. If there is not at least one past payment from the customer to the issuer of the bill or invoice statement or the vendor, then the alert engine 100 can transmit a notification to the user device 130 for verification of the vendor, for example. The Bill Payment Token Verification 306 can use the payment records 418 and/or customer records 416 to determine whether the bill was already paid, or if there is a future dated payment setup, for example.

The CalPay service 400 can use the vendor identifier to generate a dynamic list of all payment records 418 corresponding to a given vendor for transmission to vendor device 430, for example. In some embodiments, the vendor device 430 may provide its listing to CalPay service 400 for verification and to flag fraudulent activities, for example, in the event a payment record 418 indicates payment to the vendor that was not received or tracked at vendor device 430. The CalPay service 400 can provide data linked to flagged fraudulent activities to fraud detector (not shown) to detect related activities that may also be potentially fraudulent. In some embodiments, the vendor device 430 can verify the listing against their own records to flag fraudulent activities.

The fraud detector (not shown) can generate a digital fingerprint of payment activity (e.g. payment request and/or payment confirmation) to detect duplicate payment requests or payment confirmations. This can be implemented upon receiving an incoming request for a bill payment. In some embodiments, this can be integrated with Bill Payment Token Verification 306. If a duplicate payment request is detected, then the alert engine 100 can generate a notification message to prompt the customer to confirm that they want to process a duplicate payment request. The digital fingerprint can have all the payment attributes e.g. due date, amount, biller name, historical payment info etc. so that it can be used to compare any previous payment done for this particular bill.

The I/O unit 402 can enable the CalPay service 400 to interconnect with one or more input devices, such as a keyboard, mouse, camera, touch screen and a microphone, and/or with one or more output devices such as a display screen and a speaker.

The processor 404 can be, for example, any type of general-purpose microprocessor or microcontroller, a digital signal processing (DSP) processor, an integrated circuit, a field programmable gate array (FPGA), a reconfigurable processor, or any combination thereof.

Memory 408 may include a suitable combination of any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Data storage devices 410 can include memory 408, databases 412 (e.g. graph database), and persistent storage 414.

The communication interface 406 can enable the CalPay service 400 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switched telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these.

The CalPay service 400 can be operable to register and authenticate users (using a login, unique identifier, and password for example) prior to providing access to applications, a local network, network resources, other networks and network security devices. The CalPay service 400 can connect to different machines or entities.

The data storage 410 may be configured to store information associated with or created by the CalPay service 400. Storage 410 and/or persistent storage 414 may be provided using various types of storage technologies, such as solid state drives, hard disk drives, flash memory, and may be stored in various formats, such as relational databases, non-relational databases, flat files, spreadsheets, extended markup files, and so on.

Figure 5:
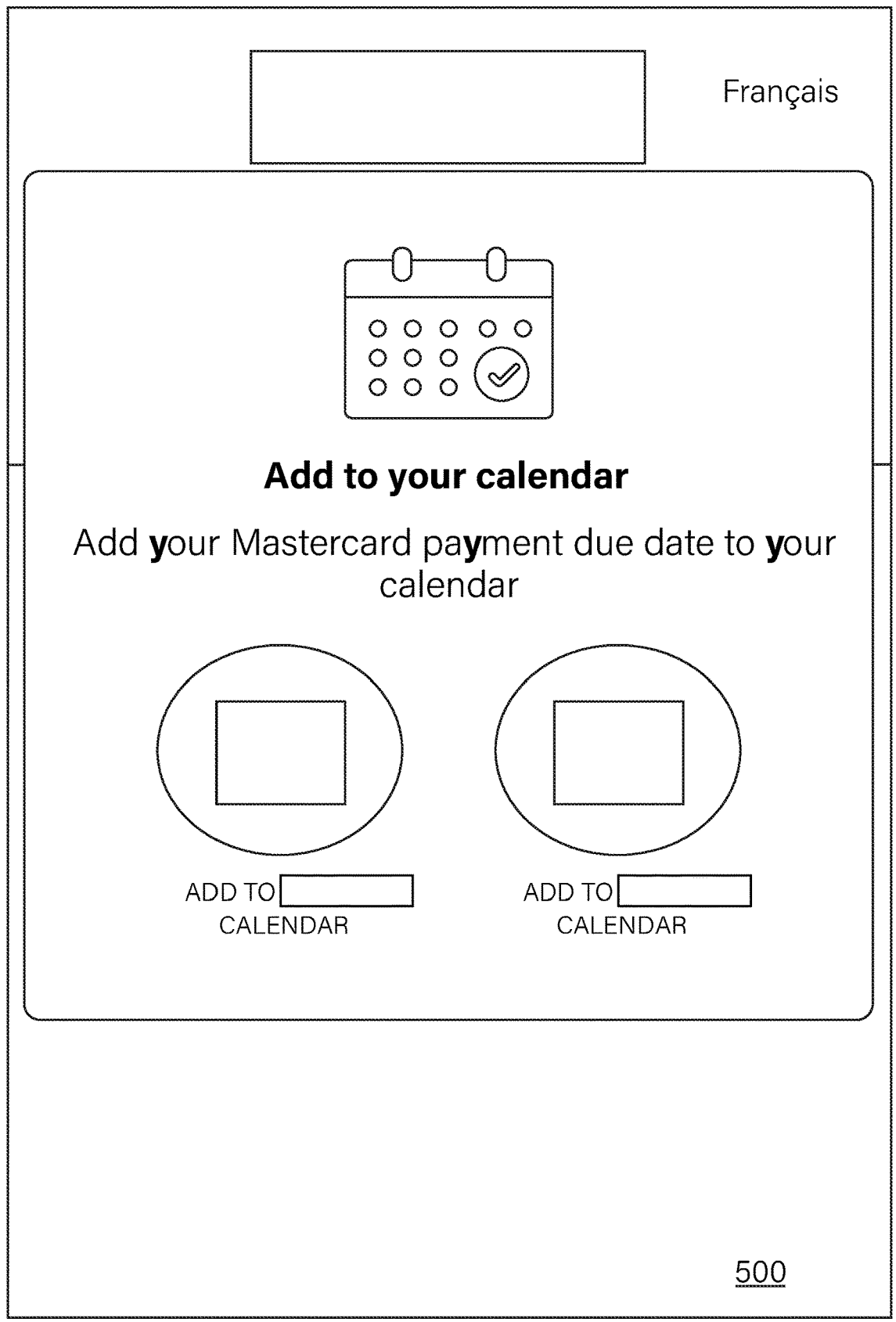
FIG. 5 shows a screenshot of an example interface according to some embodiments.

FIG. 5 shows a screenshot of an example interface 500 according to some embodiments. The interface can display at User Device 120, for example. The interface 500 shows an example of a button to add bill payment data to an electronic calendar as a calendar entry. The calendar entry can trigger an alert notification to make the bill payment based on the payment data (e.g. at a date before the payment due date). The bill payment can indicate a vendor identifier, a payment total, a payment due date, and a customer account. There can be buttons for different types of electronic calendars. The addition of a bill payment to an electronic calendar can result in the generation of a calendar reminder. Within the calendar reminder, there can be the deep link that references that exact bill payment, and can prompt the user if they have already paid that specific bill. The deep link includes a token with payment data with machine instructions for automatically making the bill payment. The deep link can include or link to bill payment attributes such as the customer identifier, vendor identifier, payment amount, customer account, and so on. The calendar entry or alert includes the deep link for selection to automate the bill payment.

The calendar (and calendar entry for the bill payment) can be integrated with an electronic wallet application in some embodiments so that the alert notification for the bill payment is generated at the wallet application. The alert notification can be presented or displayed within an interface 500 of the wallet application. The interface 500 can be generated by alert engine 100 for example, as described in relation to FIG. 2. There can be multiple buttons associated with different types of electronic calendars so that the user can select one based on their preference to trigger the process of updating the electronic calendar with the new calendar entry.

Figure 6:
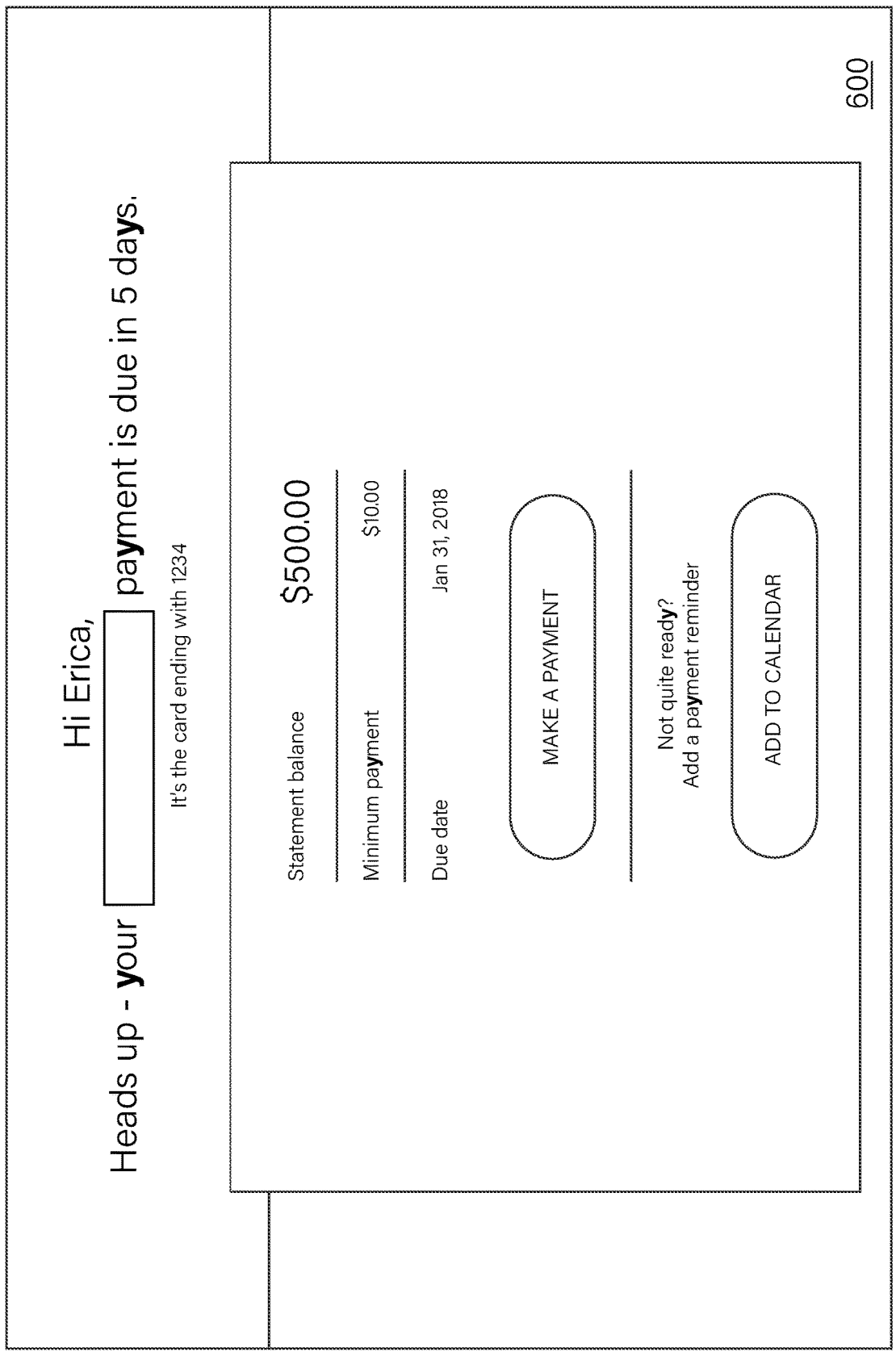
FIG. 6 shows a screenshot of an example interface with an alert that includes buttons to trigger payment actions according to some embodiments.

FIG. 6 shows a screenshot of an example interface 600 according to some embodiments with an alert that includes buttons to trigger payment actions. The interface 600 can display at User Device 120, for example. The interface 600 shows an example of a button to add bill payment data to an electronic calendar as a calendar entry. The interface 600 shows an example button to make a payment. The interface 600 can include the deep ink with token and payment data embedded therein. The interface 600 can include an indication of a payment card or account used to make the payment. The interface 600 can provide an alert notification to make the bill payment and indicate payment data (the payment due date, minimum payment amount, payment due date, vendor identifier, and so on). The deep link includes a token with payment data with machine instructions for automatically making the bill payment. The deep link can include or link to bill payment attributes such as the customer identifier, vendor identifier, payment amount, customer account, and so on. The calendar entry or alert includes the deep link for selection to automate the bill payment.

The selection of the button to add a bill payment to an electronic calendar can result in the generation of a calendar reminder and an automatic update to the electronic calendar. Within the calendar reminder, there can be the deep link that references that exact bill payment. The calendar reminder can also include a button to make a payment that can trigger the payment process, such as is described in relation to FIG. 3. The electronic calendar (and calendar entry for the bill payment) can be integrated with an electronic wallet application in some embodiments so that the alert notification for the bill payment is generated at the wallet application and presented within the interface of the wallet application.

The selection of the button to make a payment in the interface 600 can trigger the payment process, such as is described in relation to FIG. 3. The interface 600 can be generated by alert engine 100 for example, as described in relation to FIG. 2. The interface 600 can include the token and the deep link for the bill payment. As noted, the deep link includes a token with payment data with machine instructions for automatically making the bill payment. The deep link can include or link to bill payment attributes such as the customer identifier, vendor identifier, payment amount, customer account, and so on. The calendar entry or alert includes the deep link for selection to automate the bill payment.

FIG. 7 shows a screenshot of an example interface of an enhanced statement file that includes buttons to trigger payment actions according to some embodiments. The interface displays payment data such as statement balance, minimum payment, due date, payment account, and so on. A button triggers an immediate payment for the account. Another button triggers the generation of a new calendar entry with a token for making the payment. This can be used to delay the financial transaction while still automatically tracking the due date within the electronic calendar. Embodiments use tokenized calendar reminder/payment links to securely trigger the financial transaction for the customer. The token links to data secured at a data store to avoid having all data at the customer device and/or calendar application.

The discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements.

Although the embodiments have been described in detail, it should be understood that various changes, substitutions and alterations can be made herein.

Moreover, the scope of the present application is not intended to be limited to the particular embodiments of the process, machine, manufacture, composition of matter, means, methods and steps described in the specification.

As can be understood, the examples described above and illustrated are intended to be exemplary only.

What is claimed is:

1. A system for payment processing comprising:
   a payment server having a non-transitory computer-readable storage medium with computer-executable instructions for causing a processor of the payment server to:
   generate an enhanced bill statement file from an electronic bill statement file;
   extract and store payment data from the enhanced bill statement file, the payment data comprising a customer identifier, a payment amount, and a payment due date;
   generate a token including the payment data, wherein the token is encrypted, the payment server being configured to decrypt the token to access the payment data;
   store the token in association with the customer identifier, the customer identifier linked to a customer record;
   transmit to a user device an electronic message configured to display a statement notification interface having a button to add an electronic calendar entry including the token, the button having logic code to automatically add the electronic calendar entry to an electronic calendar of the user device if the button is activated at the user device, the electronic calendar entry including the token;
   upon detecting activation of the button at the user device, add the electronic calendar entry for the enhanced bill statement file to the electronic calendar of the user device using the logic code, the electronic calendar entry configured to display a second button for activating a payment request at the user device, where the second button has a deep link configured upon activation of the second button to open an electronic application on the user device and initiate a payment using payment data of the token;
   receive the payment request transmitted by the electronic application on the user device upon activation of the second button displayed by the electronic calendar entry, the payment request including the token from the electronic calendar entry that is linked to the enhanced bill statement file using the customer identifier;
   verify the token;
   decrypt the token to retrieve the payment data using the token;
   transmit a payment confirmation request to an electronic address stored in the customer record linked to the payment data, the payment confirmation request populated with the payment data;
   receive an approval notification in response to the payment confirmation request, the approval notification approving a payment transaction;
   receive a payment confirmation indicating successful processing of the approved payment transaction; and
   update a payment record with the payment confirmation and the payment data.

2. The system of claim 1, wherein the
   electronic application has a non-transitory computer-readable storage medium with computer-executable instructions for causing a processor of the mobile device to:
   provide the electronic calendar storing the electronic calendar entry;
   trigger the display of the payment confirmation request on a display device;
   receive the approval notification in response to the display of the payment confirmation request at the mobile device; and
   transmit the approval notification to the payment server.

3. The system of claim 2 wherein the electronic application is further configured to authorize a customer account prior to receiving the approval notification.

4. The system of claim 1 wherein the payment server is configured to process a registration request to store the electronic address in the customer record to permit processing of the payment request.

5. The system of claim 1 wherein the payment server is configured to determine that a previous bill payment corresponding to the enhanced bill statement file has already been made and generate a notification indicating that the previous bill payment corresponding to the enhanced bill statement file has already been made.

6. The system of claim 5 wherein the payment server is configured to determine that the previous bill payment corresponding to the enhanced bill statement file has already been made using a payment history record.

7. The system of claim 1 wherein the payment server is configured to determine that a future dated payment request corresponding to the enhanced bill statement file is already configured and generate a notification indicating the future dated payment request.

8. The system of claim 1 wherein the payment data indicates a payment account, wherein the payment request indicates the payment account.

9. The system of claim 8 wherein the approval notification indicates a payment account identifier linked to the payment account.

10. The system of claim 1 wherein the payment request indicates a payment amount, a payment due date, a vendor identifier, and a vendor account identifier.

11. The system of claim 1 wherein the payment request indicates a payment amount, a payment due date, a vendor identifier, a vendor account identifier, and a payment account.

12. The system of claim 1 wherein the payment server determines if the payment request is a duplicate request using historical payment records and upon determining that the payment request is a duplicate indicating the detected duplicate in the payment confirmation request.

13. The system of claim 1, wherein the payment request comprises a second electronic message including the token linked to the enhanced bill statement file using the customer identifier.

* * * * *